July 20, 1965  G. L. CLARK ETAL  3,195,405
OPTICAL ATTENUATOR

Filed Dec. 7, 1962  2 Sheets-Sheet 1

INVENTORS
GEORGE L. CLARK
FRANK L. PRENDERGAST
BY
Jerry A. Dinardo
AGENT

July 20, 1965  G. L. CLARK ETAL  3,195,405
OPTICAL ATTENUATOR

Filed Dec. 7, 1962  2 Sheets-Sheet 2

GEORGE L. CLARK
FRANK L. PRENDERGAST
INVENTORS

BY Jerry G. Dinardo

AGENT

United States Patent Office 3,195,405
Patented July 20, 1965

3,195,405
OPTICAL ATTENUATOR
George L. Clark, Hawthorne, and Frank L. Prendergast, Palos Verdes Estates, Calif., assignors, by mesne assignments, to Thompson Ramo Wooldridge Inc., Cleveland, Ohio, a corporation of Ohio
Filed Dec. 7, 1962, Ser. No. 243,089
14 Claims. (Cl. 88—61)

This invention relates generally to optical attenuators, and more particularly to simplified means for providing optical attenuation in small increments over a wide range.

Optical attenuators serve useful functions in various kinds of electro-optical systems. One example of such use is in conjunction with photosensitive devices for reducing the intensity of light actuating signals which might otherwise overload and damage the devices. In addition, an attenuator may serve as a noise discriminator by reducing the intensity of spurious light signals received by the photosensitive device to such an extent that they fall below the response level of the device, while certain desired signals fall above said response level.

One type of apparatus which may utilize a photoresponsive device is an electronic camera capable of recording ultrahigh speed luminous transient phenomena. The photosensitive device responds to the luminous phenomena to generate a trigger signal for actuating the camera. In order to adapt the photosensitive device to a large variety of applications, the range of light attenuation required is unusually large, say a million to one. Furthermore, it is necessary to provide this wide range of attenuation in small steps, such as by factors of 2 or 2.5, while minimizing space requirements.

Accordingly, an object of this invention is to provide an optical attenuator capable of providing attenuation in small increments over a wide range.

A further object is to reduce the space requirements of an optical attenuator having the above-mentioned capability.

The foregoing and other objects are achieved in accordance with the invention by means of a light attenuator which includes a disk of light opaque material formed with at least two groups of apertures of graded size. At least some of the apertures of a first group are of the same size as corresponding apertures of the second group. Light passing through any selected one of the apertures of the first group is attenuated in accordance with the reduced size of the aperture. The apertures of the second group are covered by a neutral density filter of a specified density or attenuation factor. Thus, the light passing through any selected one of the apertures of the second group is attenuated according to the reduced size of the aperture and additionally by a factor related to the density of the filter.

In some embodiments, an additional disk is provided with apertures that are covered by neutral density filters of different density. The combination of apertures in the two disks provides an even greater attenuation range than is achieved with one disk.

Figure 1:
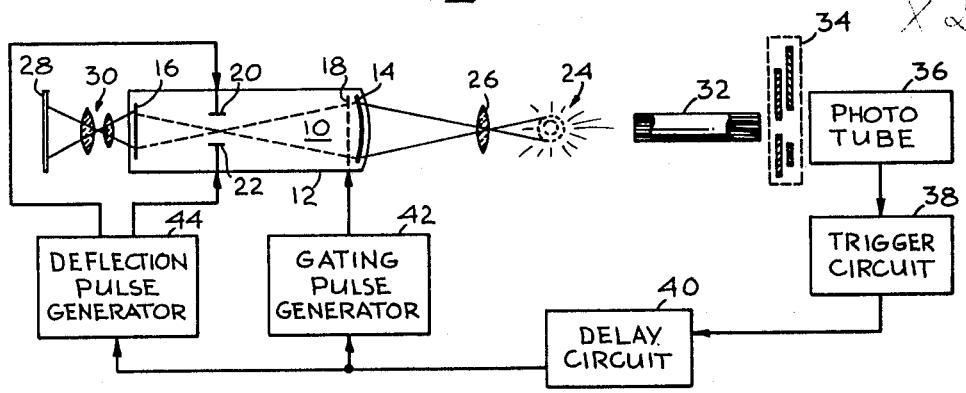
FIG. 1 is a schematic diagram of an electronic camera system employing an optical attenuator according to the invention.

Referring now to the drawing, FIG. 1 is a schematic diagram of an electronic camera system employing an optical attenuator according to the invention. The electronic camera system includes as one of its principal components an image converter camera tube 10 which functions primarily as a high speed shutter. Another function of the camera tube 10 is that of providing light amplification for the extremely short frame times involved in its high speed photographic operation.

The camera tube 10 comprises essentially a cylindrical evacuated envelope 12 containing a photoemissive cathode or photocathode 14 at one end, a fluorescent screen 16 at the other end, a control grid 18 adjacent to the photocathode 14, and a pair of deflection plates 20 and 22 between the control grid 18 and the fluorescent screen 16. Certain other parts and components essential to the operation of the camera tube 10 are omitted for simplicity, since these are well known. For example, the camera tube 10 ordinarily contains additional electrodes such as focusing and accelerating electrodes, and also requires a high voltage supply. It will suffice to say that the camera tube may be one of the kind manufactured by RCA and bearing the developmental type number C73435A.

In the operation of the electronic camera for the purpose of photographing high speed transient phenomena, light from an event or object 24 is focused by a lens 26 onto the photocathode 14 of the camera tube 10. The electron image emitted from the photocathode 14 is normally prevented from reaching the fluorescent screen 16 by the application of a sufficiently high negative blanking voltage to the control grid 18 relative to the photocathode 14.

In operation, a rapid series of frames or exposures of the phenomenon or object 24 can be taken by applying a series of positive rectangular gating voltage pulses to the control grid 18. The gating voltage pulses are sufficiently large, such as 300 volts, to unblank the grid 18 and permit the electron image to be accelerated towards the fluorescent screen 16. The different frames or exposures may be reproduced side-by-side on the fluorescent screen 16 by applying deflection voltages to the deflection plates 20 and 22, respectively, between and during successive gating pulses. The amplified light images appearing on the fluorescent screen 16 are projected onto a photographic film 28 by means of a lens system 30. In practice, the film 28 may be part of a camera of the type which allows rapid development of the exposed film 28.

In one mode of camera operation, light from the object 24 is used to generate a trigger signal which initiates gating and deflection pulses for actuating the camera tube 10. The light emitted by the object 24 impinges on one end of a light pipe 32, which is in the form of a cable of optical fibers, and is transmitted therethrough to the opposite end adjacent to an optical attenuator 34. The optical fibers in the light pipe 32 are randomly disposed so that the average level of the light emitted from the rear end of the light pipe 32 will be the same as that impinging on the front end thereof, but the light will be uniformly distributed over the rear end irrespective of the distribution of the light impinging on the front end.

The reduced light passing through the optical attenuator 34 strikes a photosensitive device or phototube 36 which produces a current proportional to the light intensity. The current generated by the phototube 36 is fed to a trigger circuit 38, which generates an electrical signal when the current from the phototube 36 reaches a predetermined threshold value. Since this trigger circuit 38 is a threshold device, it can be used in conjunction with the phototube 36 and the optical attenuator 34 to discriminate against, or made insensitive to, earlier spurious emissions from the object 24 as long as they are of smaller magnitude than the desired signal. Accordingly, the optical attenuator 34 can reduce the intensity of the light emitted from the object 24 to safe levels to avoid damaging the phototube 36.

The output of the trigger circuit 38 is fed to a delay circuit 40, and the delayed pulse is fed to a gating pulse generator 42 and a deflection pulse generator 44 which produce the desired gating and deflection pulses for operating the camera tube 10. The delay circuit 40 generates a variable delay which permits the camera tube 10 to photograph any time portion of the event that one desires.

Figure 2:
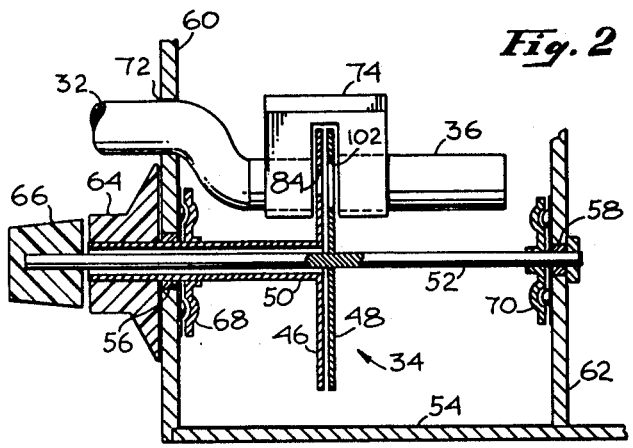
FIG. 2 is an elevational view showing the optical attenuator in combination with fiber optics and a photosensitive device.

Referring in more detail to FIG. 2, one form of optical attenuator 34 in accordance with the invention comprises a pair of closely spaced multiapertured disks 46 and 48 of light opaque material, such as metal or plastic. The disks 46 and 48 are mounted on concentric shafts 50 and 52, respectively.

The shafts 50 and 52 extend horizontally above a supporting surface or chassis 54 and are mounted in an opening 56 in a front panel 60 and an opening 58 in a mounting plate 62. The front panel 60 and mounting plate 62 are fixed to the chassis 54. The shafts 50 and 52 are provided with knobs 64 and 66 for rotating the disks 46 and 48 independently to desired positions. In order to stop the shafts 50 and 52 and the disks 46 and 48 in selected positions, locking means such as ball detents 68 and 70 may be provided on the front panel 60 and mounting plate 62, respectively.

The light pipe 32 is brought through an opening 72 in the front panel 60 and is supported with its output end adjacent a selected aperture in the first disk 46. The output end of the light pipe 32, and the phototube 36 are mounted in alignment with selected apertures in the disks 46 and 48 by means of a yoke 74. In the disk positions shown, the light pipe 32 and phototube 36 are aligned with apertures designated 84 and 102.

Figures 3, 4:
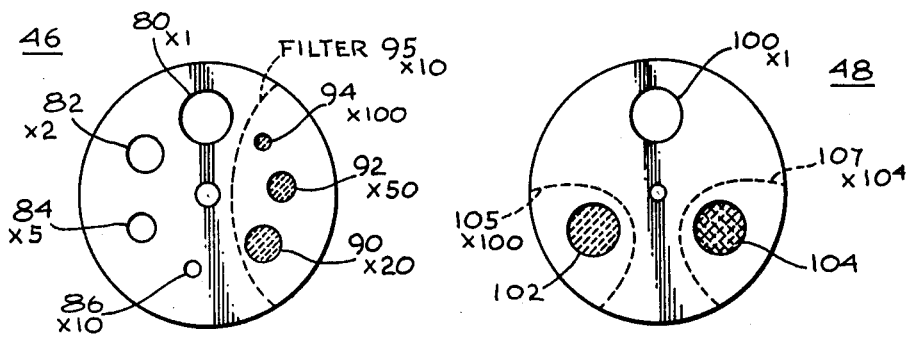
FIGS. 3–6 are plan views showing the construction of different optical attenuator elements.

As shown more clearly in FIGS. 3 and 4, the first disk 46 is formed with a plurality of apertures of graded size arranged circumferentially at common radius. In this embodiment, the apertures of the first disk are in two groups. The first group of graded size apertures includes apertures 80, 82, 84, and 86, and the second group includes apertures 90, 92, and 94. The largest aperture 80 in the first group is of the same diameter as the light pipe 32 so that it will pass all of the light transmitted through the cable 32. Successive apertures 82, 84, and 86 diminish progressively in diameter so that aperture 82 will pass only ½ of the light transmitted through the light pipe 32, aperture 84 will pass ⅕ of the light, and aperture 86 will pass 1/10 of the light. Stated another way, apertures 82, 84, and 86 have light attenuation factors of 2, 5, and 10, respectively. Legends are applied to the drawings to show the attenuation factors.

Aperture 90 of the second group is the same size as aperture 82 of the first group, aperture 92 is the same size as aperture 84, and aperture 94 is the same size as aperture 86. The apertures 90, 92, and 94 of the second group are covered by a neutral density filter 95 which has a light attenuation factor of 10. The portions of the filter 95 covering the apertures are shown shaded. A neutral density filter is defined as a filter that attenuates light by the same ratio regardless of the intensity and wave-length of the incoming light. Accordingly, the reduced size of apertures 90, 92, and 94 coupled with the filter 95 will attenuate the light by factors of 20, 50, and 100. The legends applied to the apertures indicate the total attenuation factors.

The second disk 48 is formed with three apertures 100, 102, 104 each at least equal in size to the largest aperture 80 in the first disk 46. The three apertures 100, 102, and 104 are circumferentially disposed about the same radius as are the apertures in the first disk 46, so that selected apertures of both disks 46 and 48 can be aligned with one another. Aperture 100 is left uncovered, while aperture 102 is covered with a neutral density filter 105 having an attenuation factor of 100, and aperture 104 is covered with a neutral density filter 107 having an attenuation factor of $10^4$.

Neutral density filters per se are well known in the art. A neutral density filter having an attenuation factor of 10 is spoken of as having a density of 1; a filter having an attenuation factor of 100 has a density of 2; a filter having an attenuation factor of $10^4$ has a density of 4; and so on, the density being the logarithm of the attenuation factor.

It will be seen that when aperture 80 of the first disk 46 is aligned with aperture 100 of the second disk 48, there will be no attenuation of the light passing between the light tube 32 and the phototube 36. When aperture 94 of the first disk 46 is aligned with aperture 104 of the second disk 48, the light passing between the light tube 32 and the phototube 36 will be attenuated by a factor of one million. When aperture 84 of the first disk 46 is aligned with aperture 102 of the second disk, the light attenuation factor is 500. Other attenuation factors between one and one million in steps of 2 or 2.5 can be realized by selecting appropriate apertures in the two disks 46 and 48.

It is noted that some duplication will result from the embodiment just described. For example, when aperture 80 of the first disk 46 is aligned with aperture 104 of the second disk 48 an attenuation factor of $10^4$ will be realized. The same attenuation factor is realized when aperture 94 of the first disk 46 is aligned with aperture 102 of the second disk 48. The arrangements described below may be used where no duplication is desired.

Figure 5:
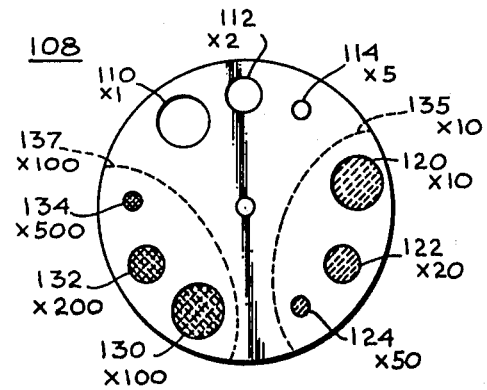

The embodiment of FIG. 5 employs a single disk for achieving light attenuation factors over a range of 500. A single disk 108 is provided with three groups of apertures of graded size. The first group includes aperture 110 which gives no attenuation, or has a factor of 1, the second aperture 112 has an attenuation factor of 2, and the third aperture 114 has an attenuation factor of 5. These apertures are repeated in the second and third groups as apertures 120, 122, 124, and apertures 130, 132, 134, respectively. The second group of apertures is covered by a neutral density filter 135, having an attenuation factor of 10, and the third group of apertures is covered by a neutral density filter 137 having an attenuation factor of 100. Thus, the covered apertures 120–124 and 130–134 provide attenuation factors of 10, 20, 50, 100, 200, and 500.

Figure 6:
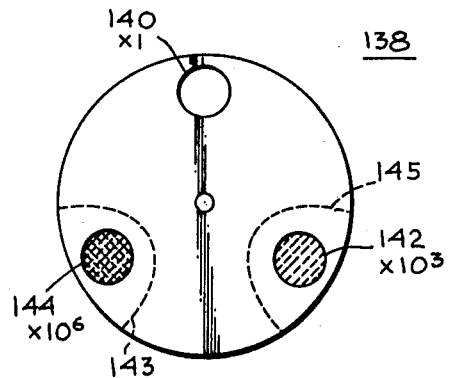

By combining the disk 108 of FIG. 5 with a second disk 138 shown in FIG. 6, the range of attenuation can be extend to $5 \times 10^5$, or to $5 \times 10^8$, or higher. The disk 138 is formed with three apertures 140, 142, 144 of equal size. Aperture 140 is uncovered and has an attenuation factor of 1; aperture 142 is covered by a neutral density filter 145 having an attenuation factor of $10^3$, and aperture 144 is covered by a neutral density filter 143 having an attenuation factor of $10^6$. When using the aperture 142 in combination with the apertures of the first disk 108, the range can be extended to $5 \times 10^5$. When using the aperture 144 in combination with the apertures of the first disk the range can be extended to $5 \times 10^8$.

Figure 7:
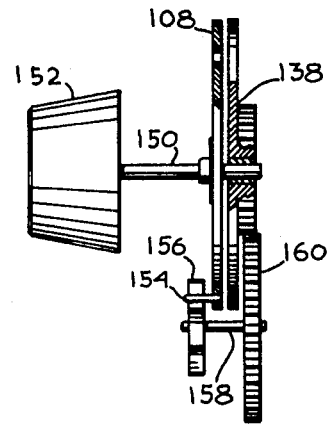
FIG. 7 is a sectional view showing an attenuator with driving means therefor.

FIG. 7 shows a mechanical arrangement utilizing a single knob for driving the two disks 108 and 138 of FIGS. 5 and 6 so as to select any desired attenuation factor. The two disks 108 and 138 are mounted on the same shaft 150 provided with a knob 152. Disk 138 is arranged to turn freely on shaft 150. The disk 108 carries an axially extending pin 154 near its periphery which is adapted to engage a star-shaped wheel 156. Each revolution of the pin 154 advances the wheel 156 one notch.

The wheel 156 is mounted on a second shaft 158 carrying a gear 160 which drives the second disk 138. The apertures in the second disk 138 can be spaced in such a manner that successive revolutions of the pin 154 will advance the second disk 138 to position the apertures 140, 142, 144 in successive alignment with the light path. Each aperture of the second disk 138 remains fixed during one revolution of the first disk 108 so that the apertures of the first disk 108 can be aligned therewith when the first disk 108 indexes.

Figure 9:
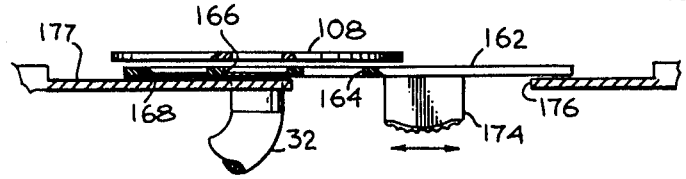
FIG. 9 is a sectional view of the attenuator of FIG. 8.
Figure 8:
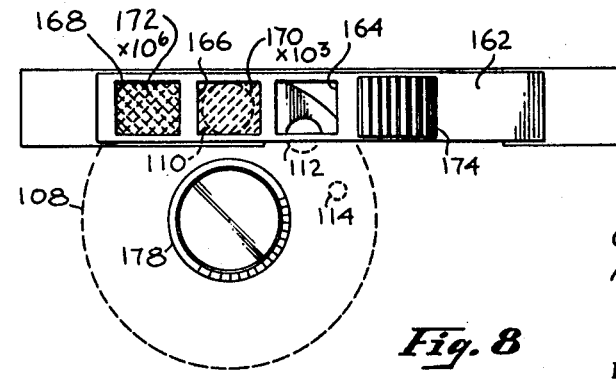
FIG. 8 is an elevational view of a modified form of attenuator.

FIGS. 8 and 9 show another attenuator arrangement in which a slide member 162 is used in place of the second disk 138 of FIG. 6. The slide member 162 is provided with three apertures 164, 166, 168. One aperture 164 is uncovered, the second aperture 166 is covered by a neutral density filter 170 having an attenuation factor of $10^3$, and the third aperture 168 is covered by a neutral density filter 172 having an attenuation factor of $10^6$. A button 174 attached to the slide member 162 is movable within a slot 176 formed in a panel 177 to select either of the two filters 170, 172 or the uncovered aperture 164. The disk 108 is rotated by a knob 178 attached to a shaft as in the previous embodiments.

The embodiments of the invention in which an exclusive property or privilege is claimed are defined as follows:

1. A light attenuator comprising a member of light opaque material,
means forming at least two groups of apertures of graded size in said member, a plurality of the apertures of a first group being of the same size as the corresponding apertures of the second group,
and a neutral density filter covering each of the apertures of said second group and having an attenuation factor that is at least equal to the attenuation provided between the smallest and largest aperture of said first group.

2. A light attenuator according to claim 1, wherein all but one of the apertures of said first group are of the same size as the corresponding apertures of said second group.

3. The invention according to claim 1, wherein all of said apertures are circular in shape and are circumferentially arranged along a circle passing through their centers.

4. A light attenuator comprising a first member of light opaque material,
means forming at least two groups of circular apertures of graded size in said member, said apertures being circumferentially arranged along a first circle passing through their centers, a plurality of the apertures of a first group being of the same diameter as the corresponding apertures of the second group,
a neutral density filter covering each of the apertures of said second group and having an attenuation factor that is at least equal to the attenuation provided between the smallest and largest aperture of said first group,
a second member of light opaque material adjacent to said first member, means forming a third group of circular apertures of equal size in said second member, said third group of apertures being circumferentially arranged along a second circle passing through their centers that is concentric with and equal in diameter to said first circle,
each of the apertures of said third group except one being covered by a neutral density filter; and
means mounting said members in close adjacency, with the apertures of said first member selectively registrable with the apertures of said second member.

5. A light attenuator, comprising:
a member of light opaque material;
means forming three groups of apertures of graded size in said member, the apertures of one group being of the same size as corresponding apertures of each of the other two groups;
a neutral density filter having a density of 1 covering the apertures of one group;
and a neutral density filter having a density of 2 covering the apertures of another group;
the third group of apertures being free of a neutral density filter and having an attenuation factor less than 10.

6. The invention according to claim 5, wherein the apertures of each group differ in area in the ratio of 1, ½, ⅕, respectively.

7. A light attenuator, comprising:
a first member of light opaque material;
means forming three groups of apertures of graded size in said member, the apertures of one group being of the same size as corresponding apertures of each of the other two groups;
a neutral density filter having a density of 1 covering the apertures of one group;
a neutral density filter having a density of 2 covering the apertures of another group;
the third group of apertures being free of a neutral density filter and having an attenuation factor less than 10;
a second member of light opaque material;
means forming at least two apertures in said second member which are at least coextensive in area with the largest aperture in said first member;
a neutral density filter having a density of 1 covering one of the apertures in said second member;
and means mounting said members in close adjacency, with the apertures of said first member selectively registrable with the apertures of said second member.

8. The invention according to claim 7, wherein said second member is formed with three apertures;
and further includes a neutral density filter having a density of 1 covering one of the apertures in said second member;
and a neutral density filter having a density of 2 covering another aperture in said second member.

9. In combination:
a light attenuator comprising a member of light opaque material,
means forming at least two groups of apertures of graded size in said disk, a plurality of the apertures of a first group being of the same size as the corresponding apertures of the second group,
a neutral density filter covering each of the apertures of said second group and having an attenuation factor that is at least equal to the attenuation provided between the smallest and largest aperture of said first group;
a cable of optical fibers having one end mounted adjacent one side of said member;
a light responsive detector having its light sensitive surface mounted adjacent the other side of said member;
means mounting the end of said cable in alignment with said detector;
and means for selectively registering each of the apertures of said light attenuator with the end of said cable and said light sensitive surface.

10. In combination:
a light attenuator comprising:
a first member of light opaque material,
means forming three groups of apertures of graded size in said member, the apertures of one group being of the same size as corresponding apertures of each of the other two groups,
a neutral density filter having a density of 1 covering the apertures of one group,
a neutral density filter having a density of 2 covering the apertures of another group,
the third group of apertures being free of a neutral density filter and having an attenuation factor less than 10,
a second member of light opaque material mounted adjacent said first member,
means forming at least two apertures in said second member coextensive in area with the largest aperture in said first member,
a neutral density filter having a density of 1 covering one of the apertures in said second member;

a cable of optical fibers having one end mounted adjacent one of said members;

a light responsive detector having its light sensitive surface mounted adjacent the other one of said members;

means mounting the end of said cable in alignment with said detector;

and means for selectively registering the apertures of each member with the end of said cable and said light sensitive surface.

11. The invention according to claim 10, wherein the apertures of said first member are circular in shape and are arranged circumferentially along a circle passing through their centers.

12. The invention according to claim 11, wherein said members comprise independently rotatable disks.

13. The invention according to claim 11, wherein said members comprise coupled rotatable disks.

14. The invention according to claim 11, wherein said first member is a rotatably mounted disk, and said second member is slidably mounted.

References Cited by the Examiner

UNITED STATES PATENTS

| 696,860 | 4/02 | Dawson | 88—23 |
| 1,556,766 | 10/25 | Ybarrando | 88—14 |
| 2,380,216 | 7/45 | Carter | 95—64 |
| 2,386,878 | 10/45 | Nickerson | 88—112 X |
| 2,951,736 | 9/50 | Black | 88—1 |

JEWELL H. PEDERSEN, *Primary Examiner.*